United States Patent Office 3,566,718
Patented Mar. 2, 1971

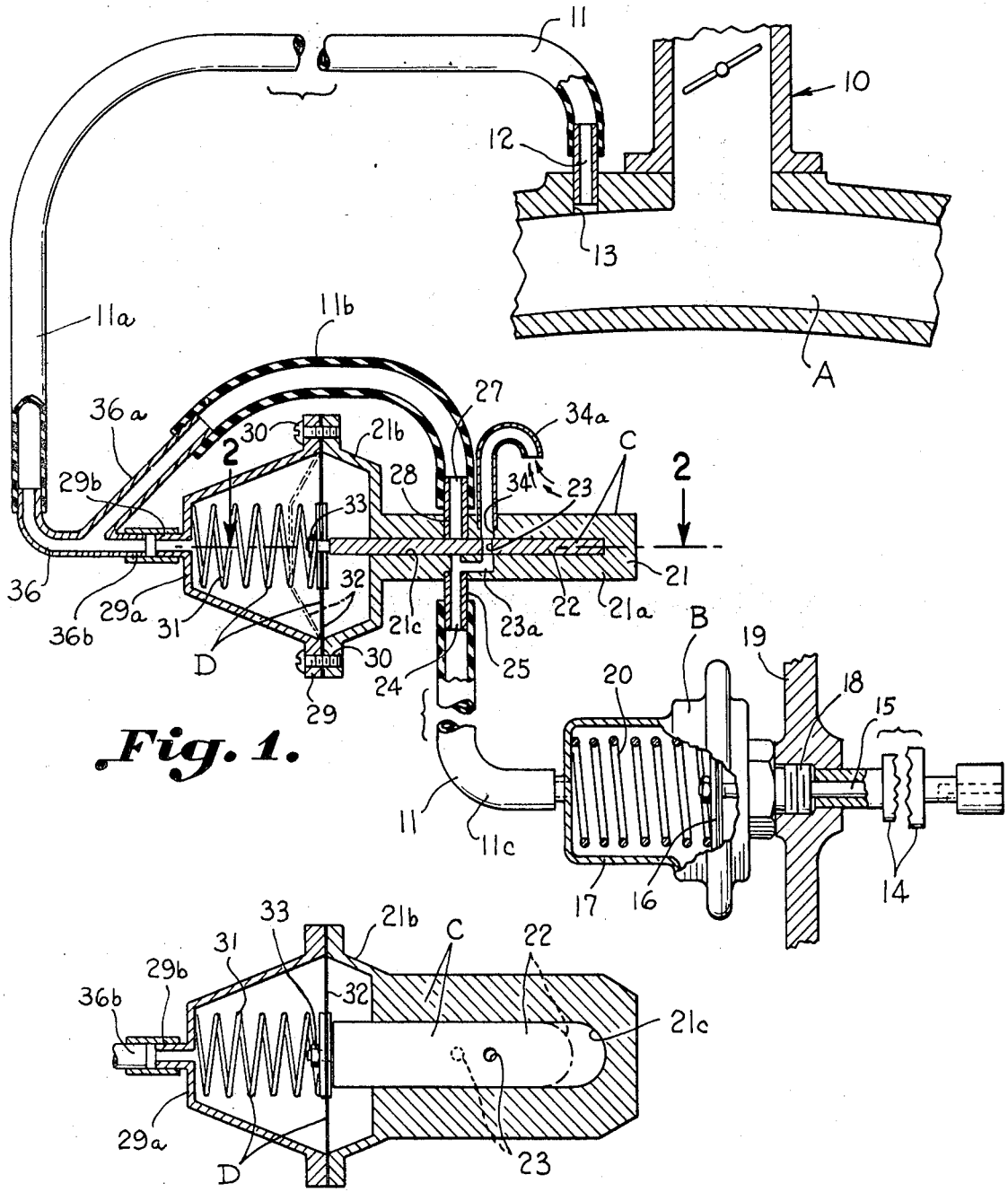

3,566,718
VEHICLE TRANSMISSION CONTROL MECHANISM
Julian H. Wightman, 1005 Pine Forest Drive,
Greenwood, S.C. 29646
Filed Apr. 8, 1969, Ser. No. 814,378
Int. Cl. B60k 23/00
U.S. Cl. 74—863                                  4 Claims

ABSTRACT OF THE DISCLOSURE

Control mechanism for a vehicle automatic transmission having a fluid pressure responsive modulator therefor includes, a valve having a movable element for opening a port for positively controlling pressure upon the modulator, moved responsive to variation in intake manifold pressure when engine operation calls for an up change.

---

This invention relates to control mechanism for an automobile automatic transmission operated responsive to a fluid pressure responsive modulator wherein auxiliary valve means are moved responsive to engine operation to produce a change in pressure acting upon the modulator means when an up change in the transmission is called for.

Experience has shown over a period of time that transmission difficulties occur on some models of automobiles, such as Chevrolets of 1962 through 1967 models having aluminum case "Power Glide" transmissions. Such transmissions are controlled by a modulator which has a plunger controlled mechanism operated by a spring biased diaphragm valve subjected to pressures obtaining in the intake manifold. Such transmissions, after a period of time, tend to slip on an up change or a change from low to direct drive. Such a change normally occurs about 18 to 20 miles per hour. It is believed that this difficulty is occasioned because the modulator valve is held open too long. This is believed to result from the variations in manifold pressure not being sufficiently pronounced to exert a positive enough control on the transmission mechanism controlled thereby.

At present, the modulator is connected directly to the intake manifold and there is no positive control other than variation in manifold pressure acting upon the spring biased diaphragm valve of the modulator for controlling the transmission mechanism. This invention is concerned with the provision of a positive auxiliary means for controlling the transmission control mechanism when an up change is called for by engine operating conditions. Such may be provided in the form of an attachment for existing transmissions avoiding costly repair or such may be furnished as original equipment.

Accordingly, it is an important object of this invention to provide auxiliary control mechanism for an automobile transmission having a fluid pressure responsive modulator.

Another important object of this invention is to provide a control means for facilitating the up change of automatic transmissions controlled by fluid pressure responsive modulators.

Another important object of this invention is to avoid transmission slipping which occurs in automatic transmissions when effecting an up shift from low to direct drive.

Still another important object of this invention is to provide a positive auxiliary control for modulator operated automatic transmissions.

The construction designed to carry out the invention will be hereinafter described, together with other features thereof.

The invention will be more readily understood from a reading of the following specification and by reference to the accompanying drawing forming a part thereof, wherein an example of the invention is shown and wherein:

FIG. 1 is a transverse sectional elevation illustrating a vehicle transmission control mechanism constructed in accordance with the present invention installed upon an automobile having a fluid pressure modulator controlled automatic transmission, and FIG. 2 is a sectional plan view taken along line 2—2 in FIG. 1.

The drawing illustrates an internal combustion engine for driving a vehicle, such as an automobile, having an intake manifold A communicating with a fluid pressure responsive modulator means B for moving same responsive to variation in pressure in the manifold produced upon engine operation to initiate an up change by the transmission. A control mechanism for the modulator includes valve means C having a movable element. Means D are provided causing movement of the movable element, responsive to engine operation, to a predetermined position when resulting manifold pressure calls for an up change. The valve means has a port therein, opened by said movable element when in said predetermined position, for fluid communication with the modulator means for varying the pressure thereon so as to facilitate movement of said modulator means. In the embodiment illustrated the modulator is opened to the atmosphere, removing the manifold vacuum entirely, permitting unrestricted spring action for moving the plunger. Thus, an up change of the transmission is facilitated.

The intake manifold A carries a carburetor, broadly designated at 10, and a line 11 provided with a fitting 12 communicates with an opening 13 in the intake manifold A. Heretofore, the fluid pressure responsive modulator B communicated directly through the line 11 to the intake manifold A to actuate the modulator valve plunger 14, which controls the transmission, responsive to manifold pressure. The plunger 14 is moved by the operator shaft 15 which has connection to the diaphragm 16 of the modulator B. The modulator housing 17 has threaded connection as at 18 within the transmission housing 19. The diaphragm 16 is spring biased toward the right-hand side of FIG. 1 by the compression spring 20.

The valve means C includes a housing 21 which has a flat portion 21a carrying a dish shaped portion 21b. The flat portion 21a has a recess 21c therein for accommodating a movable element 22. The movable element 22 has a port 23 therein, which is closed within the recess 21c except when it is in alignment with the bore 24 of a fitting 25 which has suitably fixed connection with the valve C, or when it is in the position shown in FIG. 1. The bore 24 is in alignment with the bore 27 of a fitting 28 which is in vertical alignment with the fitting 25 and connected to the valve C. The bore 24 extends through the flat portion 21a and into the recess 21c. The dish shaped housing portion 21b is connected with the housing 29 of a diaphragm valve by screws 30 which extend through respective flange portions thereof. The diaphragm valve housing of the means D includes a seat portion 29a for confining the compression spring 31 against the diaphragm 32.

The spring 31 normally urges the diaphragm toward the solid line position of FIG. 1 and carries the movable element 22 which has fixed connection therewith as at 33, to position where the port 23 is in alignment with the passageway 23a in the flat portion 21a. The bore 24 then communicates with the passageway 34 in the valve C, and thence through the line 34a to the atmosphere, through the passageway 23a and the port 23.

The housing 29 communicates through a nipple portion 29b with a fitting 36. The fitting 36 has a first branch 36a and second branch 36b. The fitting 36 is connected to the line 11a which is a portion of the line 11. The branch 36a communicates through the line 11b with the fitting 28. The branch 36b communicates with the nipple 29b. The fitting 24 communicates with the modulator housing 17 through the line 11c. If desired the movable element 22 could be moved responsive to linkage from the carburetor or other element which moves in sequence with the initiation of an up change.

In operation, when the vacuum in the manifold A has been reduced initiating an up shift or change, the spring 31 has moved the diaphragm 32 to solid line in FIG. 1. The port 23 then permits the manifold vacuum which had been retained on the modulator B to be relieved by subjecting same to atmospheric pressure through the line 34a. Manifold vacuum had been retained on the modulator B during movement of the movable element 22 by virtue of the confinement of the port 23 within the recess 21c. Such movement had been produced by the spring 31 against the diminishing force of the manifold vacuum exerted upon the diaphragm 32. Initially a high degree of vacuum had been placed upon the modulator B when the diaphragm 32 was in broken line position in FIG. 1, and the port 23 was aligned with the bores 24 and 27 and the intake manifold A communicated therethrough to the modulator B. Thus, a positive control is exerted upon the modulator by the sudden release of a high degree of vacuum in contrast to the former gradual reduction in manifold vacuum.

While a preferred embodiment of the invention has been described using specific terms, such description is for illustrative purposes only, and it is to be understood that changes and variations may be made without departing from the spirit or scope of the following claims.

What is claimed is:

1. For use in a vehicle driven by an internal combustion engine, in combination with an automatic transmission having a fluid pressure responsive modulator means moved responsive to variation in pressure in the intake manifold produced upon engine operation to facilitate an up change by the transmission, a control mechanism for said modulator including, valve means having a movable element, means causing movement of said movable element responsive to manifold pressure to a predetermined position when engine operation calls for an up change, said valve means having a port therein opened to the atmosphere by said movable element when in said predetermined position for fluid communication with said modulator means for varying the pressure thereon so as to facilitate movement of said modulator means, whereby an up change of the transmission is facilitated.

2. The structure set forth in claim 1, wherein said movable element moves from a first position wherein said port is in fluid communication with the intake manifold and said modulator means responds to said variation in pressure to a second position wherein said port is open to the atmosphere.

3. The structure set forth in claim 1, wherein the engine has an intake manifold within which said variation in pressure occurs, wherein said means causing movement of said movable element is a spring biased diaphragm, and wherein said movable element moves from a first position in which said port is in fluid communication with the intake manifold and said manifold is in fluid communcation with said modulator means to a second position wherein said port is open to the atmosphere.

4. For use in a vehicle driven by an internal combustion engine, in combination with an automatic transmission having a fluid pressure responsive modulator means moved responsive to variation in pressure produced upon engine operation to facilitate an up change by the transmission, a control mechanism for said modulator including, valve means having a movable element, means causing movement of said movable element responsive to engine operation to a predetermined position when engine operation calls for an up change, and said valve means having a port therein opened by said movable element when in said predetermined position for fluid communication with said modulator means for varying the pressure thereon so as to facilitate movement of said modulator means, whereby an up change of the transmission is facilitated.

References Cited

UNITED STATES PATENTS

| | | | |
|---|---|---|---|
| 2,588,140 | 3/1952 | McFarland et al. | 74—864 |
| 2,938,403 | 5/1960 | Harrison et al. | 74—863 |
| 3,295,388 | 1/1967 | Groves | 74—844 |
| 3,410,159 | 11/1968 | Zundel | 74—863 |

C. J. HUSAR, Primary Examiner

U.S. Cl. X.R.

92—36